United States Patent [19]

Flanders

[11] 4,050,604
[45] Sept. 27, 1977

[54] DISASSEMBLEABLE, REUSABLE CONTAINER

[76] Inventor: Robert D. Flanders, 28035 SW. Parkway Ave., Wilsonville, Oreg. 97070

[21] Appl. No.: 490,497

[22] Filed: July 22, 1974

[51] Int. Cl.² .................. B65D 9/18; B65D 7/24; B65D 19/12; B65D 19/16
[52] U.S. Cl. .................. 220/4 F; 206/599; 206/600; 217/13; 217/55; 220/63 R; 220/83; 312/108
[58] Field of Search .............. 217/12 R, 13, 5, 43 R, 217/43 A, 44, 45, 3 R, 3 BC, 55; 220/4 F, 83, 84, 254, 63 R; 312/108, 111, 140; 52/264; 108/55; 206/386, 599, 600

[56] References Cited

U.S. PATENT DOCUMENTS

| | | | |
|---|---|---|---|
| 417,561 | 12/1889 | Hyatt | 217/44 |
| 1,175,028 | 3/1916 | Walwig | 220/254 |
| 1,389,020 | 8/1921 | Tucker | 217/12 R |
| 1,498,377 | 6/1924 | Honigbaum | 217/43 |
| 2,177,507 | 10/1939 | Weiller | 217/16 |
| 2,364,083 | 12/1944 | Lindsay | 220/84 |
| 2,475,079 | 7/1949 | Clouse et al. | 312/140 |
| 2,488,692 | 11/1949 | Talbot | 217/12 R |
| 2,738,092 | 3/1956 | Ladd | 217/12 A |
| 2,745,590 | 5/1956 | Herzog et al. | 217/43 |
| 2,775,360 | 12/1956 | Philips | 217/43 A |
| 2,920,781 | 1/1960 | Butcher et al. | 217/12 R |
| 3,023,890 | 3/1962 | Scholten | 217/43 |
| 3,190,710 | 6/1965 | Freeman | 217/12 R |
| 3,307,602 | 3/1967 | Bostei | 220/254 |
| 3,321,070 | 5/1967 | Childs | 229/14 B |
| 3,401,814 | 9/1968 | Chiswell et al. | 220/4 F |
| 3,423,101 | 1/1969 | Boeye | 217/12 R |
| 3,477,604 | 11/1969 | Kridle | 217/12 |
| 3,692,201 | 9/1972 | Garduna | 217/12 R |
| 3,799,382 | 3/1974 | Munroe | 206/386 |
| 3,804,033 | 4/1974 | Izawa et al. | 108/55 |

FOREIGN PATENT DOCUMENTS 234,684  2/1945  Switzerland .................. 217/5

*Primary Examiner*—William Price
*Assistant Examiner*—Allan N. Shoap

[57] ABSTRACT

A disassemblable, reusable container system is provided which on assembly is substantially rectangular configuration providing for greater storage capacity, and on disassembly, is readily stackable in a relatively small area. The container system includes floor, bracing support, sidewall and lid members, respectively, which are interlockingly joined on to the other.

6 Claims, 6 Drawing Figures

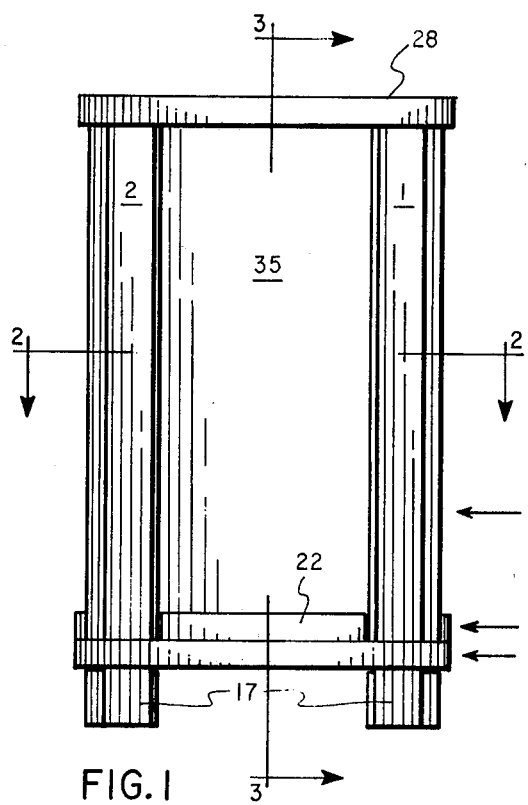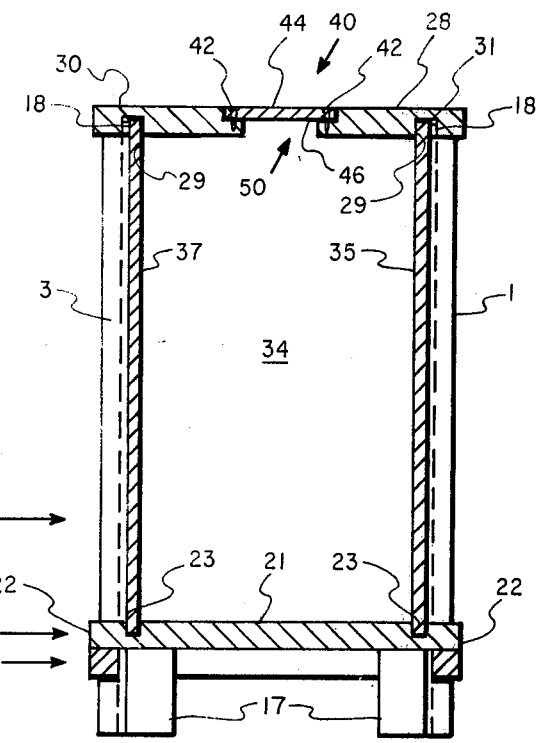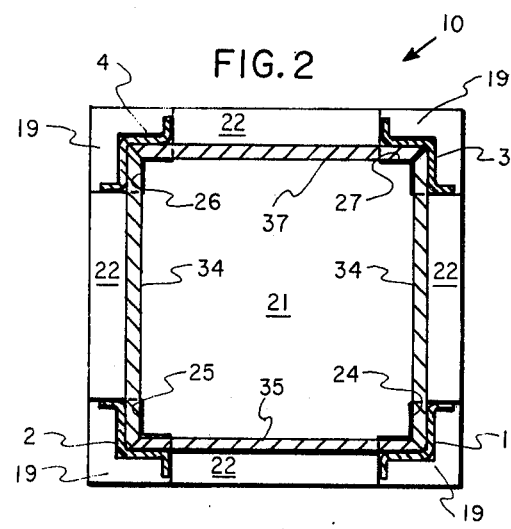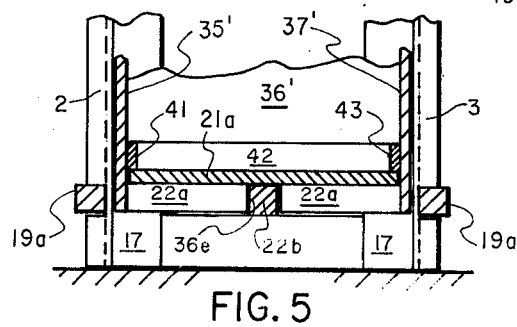
FIG. 1
FIG. 3
FIG. 2
FIG. 5

DISASSEMBLEABLE, REUSABLE CONTAINER

BACKGROUND OF THE INVENTION

In the past, wooden barrels were used for transporting fluids such as whiskey, wine and beer. Today, these barrels are no longer manufactured because of the skills required to make them, the lack of readily available, cheap hardwoods and, because the costs of materials and labor have risen to the point that most companies now use steel, plastic, and like materials, in order to make comparable containers for use in commerce.

Modern containers such as the aforementioned drums or other receptacles provide means of shipping materials, including both fluids and solids. However, these containers may be employed to transport nearly any material or product.

Drums and containers in general have a problem, namely, they go only one way. More specifically, after they are used, they normally are not returned long distances to their point of origin because they occupy too much space. Thus, the costs of returning the container to its original source, also coupled with the cost of cleaning it for reuse, in almost all cases, is higher than buying a new container. For example; some firms do pick up containers, (on a local basis,) return them to a metropolitan area, and then clean and resell them. Cleaning, aside from being more costly because of the predominantly non-opening nature of the drums, is constantly becoming more difficult from an ecological viewpoint due to the scrutiny and strict regulations of government. Thus, long distance use of drums today has become uneconomical.

SUMMARY OF THE INVENTION

It is, therefore, a primary object of the present invention to provide a novel container system that is quickly and completely disassemblable, the disassembled container being stackable in units which do not waste valuable shipping space. The subject container system eliminates the problem of substantial unused empty space that has prevented, in the past, the economical return of a standard container or drum. The disassemblable nature of the subject container makes it's inner surfaces readily accessible and easy to clean.

Finally, the rectangular configuration of the subject container system provides, as will be hereinafter discussed, about 27% more space than a comparable standard drum. This results in a significant cost saving to both the buyer and the seller of the goods being shipped.

Life expectancy of the subject containers will vary with use. Although some of these containers may be subjected to only in-plant use under controlled conditions thereby minimizing weathering and damage, most containers are in fact carelessly handled. Therefore, the disassemblable container system of the present invention has been deliberately designed to provide long term life expectancy in the face of normal or severe use. Allowances in the design of the system have been made so that slightly bent or damaged parts will still fit together and function properly. Every damaged part can be straightened with minimum cost and effort and all parts may be easily repainted. Finally, all parts of each container are readily interchangeable and replaceable when damage is beyond repair. It is, therefore, a reasonable assumption that most models of the subject container system can complete numerous round trips without substantial damage, the short- and long-term investment of capital being reduced to the lowest feasible level.

The container system of this invention is designed to fill a multitude of industrial and commercial uses without the necessity of design change. Accordingly, sizes vary with the application. Generally, a 2-foot × 2-foot × 3-foot unit represents the smallest standard size, while the 4-foot × 4-foot × 8-foot model is the largest standard model. However, the only modification necessary to accommodate the different cubages is an increase in the size of the structural members. If desired, larger units may be readily built in, for example and 8-foot × 8-foot × 20-foot size.

A focal point of this invention resides in the design of the subject container which permits the rapid assembly and disassembly of the standard components, which in the assembled state, form a container of an extremely strong and durable construction. Although features may be added to provide an air- or liquid-tight container system, the subject unit is generally not provided with this feature. Therefore, in order to provide an air- or liquid-tight system, the container should be used in conjunction with for example, a flexible envelope liner. The liner itself is normally formed of air- or water-tight design, and is capable of fitting securely within the confines of the container employed. Liners are preferably constructed of thin-wall plastic having thicknesses of about 4 to 60 mils, depending on the use. Liners having special resistance to strong chemicals and corrosive fluids can be provided as required. The liners are totally supported by the internal wall structure of the disassemblable container unit and, consequently, do not require high tensile strength. The liners are generally low-cost and may be disposed of at the point of destination or, alternatively, can be flushed out and returned to the point of origin for reuse. The use of a liner also keeps the container structure, itself, cleaner over a longer period of time. Therefore, costly cleaning procedures, as is customary with normal barrels and drums, for instance, are thereby minimized.

Functionally, the subject container system can be used as either a barrel, drum, cargo container, or like structure. If the system is to function as a drum, a bung and vent holes are normally provided in the head, bottom, or side panels. These passageways allow the liner inside the container to be filled or emptied of fluids, or other materials, through neck-type appendage or spout which accordingly provided as an integral part of the liner itself.

In contradistinction to the prior art containers which require support on a pallet or like device for use in conjunction with a standard fork lift, the subject, disassemblable container is preferably supported by its own bracing members above the surface on which it is supported. Therefore, there is adequate room for the forks of a standard lift truck to be inserted under the container so that it may be easily transported from one place to another. In addition, since the configuration of the subject container is preferably rectangular, units are readily stackable one on top of, and next to, one other. The units adjacent to and on top of one another serves to hold the respective containers in position during transit.

An additional feature of the container system of this invention is its greater capacity for hauling materials. This increase in capacity, on a relative basis, is due to the preferred configuration, i.e., rectangular, instead of cylindrical of the container. For example, it is well known that a barrel actually holds greater than 25% more material than a standard drum of comparable dimensions. More specifically, the 2-foot × 2-foot × 3-foot container of this invention has a volumetric capacity of about 12 cubic feet. In comparison, the capacity of a comparable drum having 3-foot high, 2-foot diameter dimensions has a capacity of about 9.4 cubic feet. The subject container would hold about 27% more material, by volume, than the comparable standard drum. And, because of the rectangular structure of the container, the subject system also can be stored on its side or top during transit.

The container is of sufficiently durable construction to make a minimum of fifteen round trips between the points of origin and destination, respectively, on average basis. This is in complete contradistinction to standard containers which generally go only one way. In fact, if the containers are used for lightweight cargo and the like, they may make as many as fifty or more round trips before replacement is required.

Today, shipping of disassembled parts is done in wooden crates and the like. This substantially increases transportation costs. In addition, when the point of destination is reached, the above crates must be disposed of in a manner which is costly and which normally causes ecological problems. With the reduction in the available supply of wood, the above means for shipping disassembled parts is becoming increasingly more difficult. Therefore, in order to eleviate this problem the system of the present invention permits a plurality of disassembled container parts, preferably from about 5 to 7 disassembled containers, to be stored for shipment within the confines of an assembled container of the present invention. This avoids the necessity of using auxiliary reshipping means for the disassembled containers. More specifically, a container system is provided herein which not only provided a disassembleable, sturdy unit, but in addition, in an assembled state, serves as a return shipping container for a plurality of disassembled container systems.

Today, shipping of disassembled parts is done in wooden crates and the like which substantially increases transportation costs. In addition, when the point of destination is reached, the above crates must be disposed of in a manner which normally causes ecological problems. And of course, with the reduction in the availability of wood this means of shipment is becoming more difficult. In order to eleviate this problem the subject container system permits a plurality of disassembled container parts, preferably from about 5 to 7 container parts, can be stored for shipment within the confines of an assembled container of the present invention. This avoids the necessity of using auxiliary reshipping means such as wooden crates and the like. More specifically, a container system is provided herein which not only provides a disassembleable, sturdy unit, but in addition, in an assembled state serves as a return shipping container for a plurality of disassembled container systems.

There is almost no limit to the uses to which the container of the present invention can be employed. For instance, any liquid or corrosive materials such as heavy fats, inks, greases, and the like, which are difficult to fill and empty once a given destination is reached, may be moved using the novel container system of this invention including a protective liner. Preferably, a reinforced rubber liner capable of withstanding the effects of corrosive chemicals is employed. The liner provides a means of everting the cleaning problem since it can be disposed of without having to scrub the inner walls of container. The containers are easily filled and emptied through opening provided in the lid and/or sidewalls and/or floor members, in conjunction with an expandable appendage formed as part of the liner itself.

As to the general construction of the subject disassemblable container system, a preferably rectangular or square container is provided herein having interlocking sections which bear one against the other to maintain the rigid engagement of the system in the form of a strong box-like unit. For example, bracing support members are provided which interconnect the respective floor, sidewall, lid, and leg members in providing a means for holding together the aforementioned disassemblable sections while preferably supporting the container system of the present invention above the level of the surface on which the subject container is supported. Also, other constructional features are provided for the interlocking engagement of the subject structure. More specifically, the sidewalls are in integral engagement with the respective leg, lid and floor members via a pair of peripheral grooves. And, in a further preferred structural feature a peripheral frame member engages the bracing support members to further lock them in position. Finally, the container lid, in addition to protecting the material contained therein from being damaged, acts to interlockingly secure and maintain the container in proper vertical alignment.

It is, therefore, a principal object of the present invention to provide a novel disassembleable, reusable container system which, on disassembly, is stackable in a relatively small area.

It is a further object of the present invention to provide a disassemblable, reusable container which can be supported above the surface upon which it stands and which is readily transportable without the need for auxiliary support means, from one place to another on a fork lift truck.

It is a further object of this invention to provide bracing support, sidewall, floor and leg members, respectively, which are joined in interlocking relationship, one with the other, to form a strong, durable structure on assembly. The resulting container system on disassembly, (as previously described,) enables a shipper to save a substantial amount of his return shipping costs through the use of the subject container system.

The foregoing and other objectives, features and advantages of the present invention will be more readily understood upon consideration of the foregoing detailed description of the invention taken in conjunction with the accompanying drawings.

DETAILED DESCRIPTION OF THE INVENTION

Figure 4:
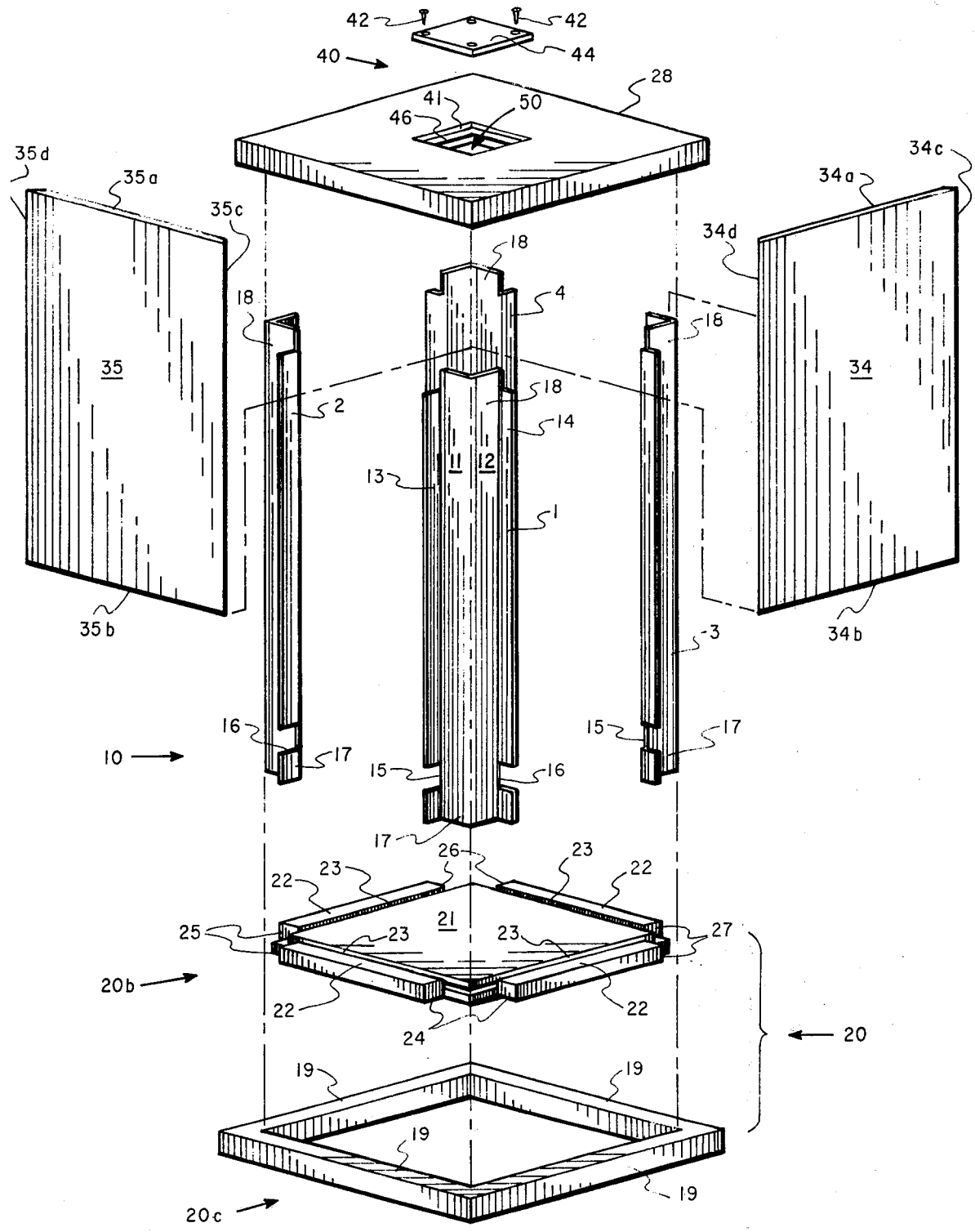

The disassembleable, reusable container system of the present invention is generally designed "10" in FIGS. 1 - 4, and can be fabricated to have numerous configurations. Preferably, however, a substantially rectangular or square unitary structure is employed since these configurations permit the assembled container system 10 to be stored in a relatively small area thereby permitting substantially more tonage to be shipped in each load. A further preferred feature of this invention provides that the container 10 be maintained above the surface on which it is supported so that the forks of a fork lift truck can readily engage the underside of the container, without requiring a pallet, for easy movement of the container from place to place. Container 10 is readily assembled and disassembled, as will hereinafter be described, by engagement or disengagement of the respective detachable parts which form the subject structure. On disassembly, the individual component parts are storeable in a substantially smaller area, for transfer on their return trip to their point of destination, than the comparable area required for a conventional drum or barrel.

Bracing support members 1 - 4 include means for detachably combining respective floor, sidewall and lid members, which will hereinafter be described to form the subject container system 10. More specifically, bracing support members 1 - 4 disassembleably join with floor member 20 to support the sidewall members 34 - 37 and to interlockingly engage lid member 28. Preferably, bracing support members 1 - 4 each include slots 15 and 16 which are, in their more preferred form, rectangular in shape. At the upper end of each bracing support member is a protruding end section 18, while at it's lower end, a support leg section 17 maintains the container system 10 above the level of the surface upon which it is supported. A more preferable configuration of bracing members 1 - 4 has a substantially W-shaped cross-section, while the protruding end section 18 has a substantially V-shaped cross-section. The W-shaped cross-sectional configuration of each bracing support member includes a pair of inwardly extending, inner bracing support sections 11 and 12 which are angularly attached along their interior, longitudinal edges, one to the other. A pair of outer bracing support sections, or flanges, 13 and 14, are angularly attached to and extend outwardly from the exterior longitudinal edges of each of the inner support sections, 11 and 12. Bracing support members 1 - 4 are preferably constructed of metal, although fabrications thereof may be provided from an impact resistant polymer, wood or wood product, and the like.

An interlocking floor member generally designated as "20", provided for supporting the material to be shipped is located within the confines of the container system of the present invention. The floor member 20 includes means for engaging and joining with bracing support members 1 - 4, as well as means for interlockingly supporting sidewalls 34 - 37. More specifically, floor member 20 comprises upper and lower support portions 20b and 20c, respectively. Preferably, upper support portion 20b includes a floor section 21, surrounded by a peripheral groove 23, which is in turn circumscribed by outer floor section 22. Notches 24 - 27, respectively, are included in each of the corners of upper floor member portion 20b, and are preferably formed and adapted for engagement with bracing support members 1 - 4 and which, in their preferable form, are built for mating alignment with a bracing support member having a substantially W-shaped cross-section. Upper portion 20b is supported on lower support 20c which is preferably comprised of peripheral frame member 19 fabricated to interlockingly engage slots 15 and 16. The floor member 20 is constructed preferably of wood, metal, an impact resistant polymer, or other like materials, and may be further reinforced by providing suitable cross-members on the underside thereof or by employing any other suitable ribbing construction.

Sidewalls 34 - 37 interlockingly engage bracing support members 1 - 4 and floor member 20 while providing support for lid member 28. Preferably, the sidewalls engage respective peripheral grooves 29 and 23 along their respective top and bottom edges 34a - 37a and 34b - 37b, sidewall edges 34c - 37c and 34d - 37d, respectively, being in bearing relationship one against the other. Edges 34c - 37c and 34d - 37d are preferably mitered to facilitate additional buttressing interaction therebetween. The sidewalls 34 - 37 are preferably made of plywood, fiberboard, particleboard, or other similar wood products, or materials such as metal, impact resistant polymers, and the like. The sidewalls may also be reinforced by the means previously described herein.

An interlocking lid member 28 serves as a cover for container system 10 protecting whatever material is contained therein. It is supported on bracing support members 1 - 14 and sidewall members 34 - 37, respectively. In the preferable form, as shown in FIGS. 1 - 4, lid 28 is provided with a peripheral groove 29, into which the aforementioned sidewalls 34 - 37 are introduced, recesses 30 - 33 being provided in the respective corners of peripheral groove 29 for receiving protruding end section 18 of bracing support members 1 - 4. Recesses 30 - 33 preferably have a V-shaped configuration. Lid 28 is preferably constructed of metal, although wood or an impact resistant polymeric material may be employed. Lid 28 may be reinforced by the means previously described. A means 40 for filling the subject container system 10 is provided in lid 28, sidewalls 34 - 37, or floor member 20. In FIG. 3, for instance, an orifice 50, in lid 28, contains a recess 41 at its upper end. A flat plate 44 fits within recess 41 to seal off orifice 50. Plate 44 may be held in place by screws 42 or other like retaining means. Gasket 46 is employed within recess 41 to help implement the tight sealing of orifice 50.

To assemble the disassembleable, reusable container system 10, according to FIGS. 1 - 4, the lower floor portion 20c, which is shown as peripheral frame member 19, is inserted in slots 15 and 16 of bracing support members 1 - 4. Upper floor portion 20b is then positioned within the confines of the vertically supported members 1 - 4 until notches 24 - 27 engage inner and outer support sections 11 - 14 so that it is resting on peripheral frame 19. Support leg sections 17, on assembly, extend downwardly below floor member 20 (see FIG. 1) forming an opening 39 into which the forks of a fork lift truck can be inserted for transporting container system 10 from one place to another. The bottom edges 34b - 37b of sidewall 34 - 37 are then positioned with adjacent sidewall edges 34c - 37c and 34d - 37d so that they are in buttressing engagement one with the other. If desired, a liner can then be placed within the confines of container system 10. The liner may be provided with an expandable neck to facilitate filling and emptying of the subject container. The expandable neck may be included in conjunction with filling means 40 in the lid, sidewall or floor members. Finally, lid 28 is secured atop the open container structure by inserting upper sidewalls edges 34a - 37a into peripheral groove 29, and protruding end section 18 into recesses 30 - 33. The lid can then be locked in place by any known conventional means, such as for example, by using an angle clip and lock assembly (not shown). To fill the container, plate 44 is removed from recess 41, first disengaging all of the screws 42. The material to be shipped can then be added through open orifice 50.

Figure 6:
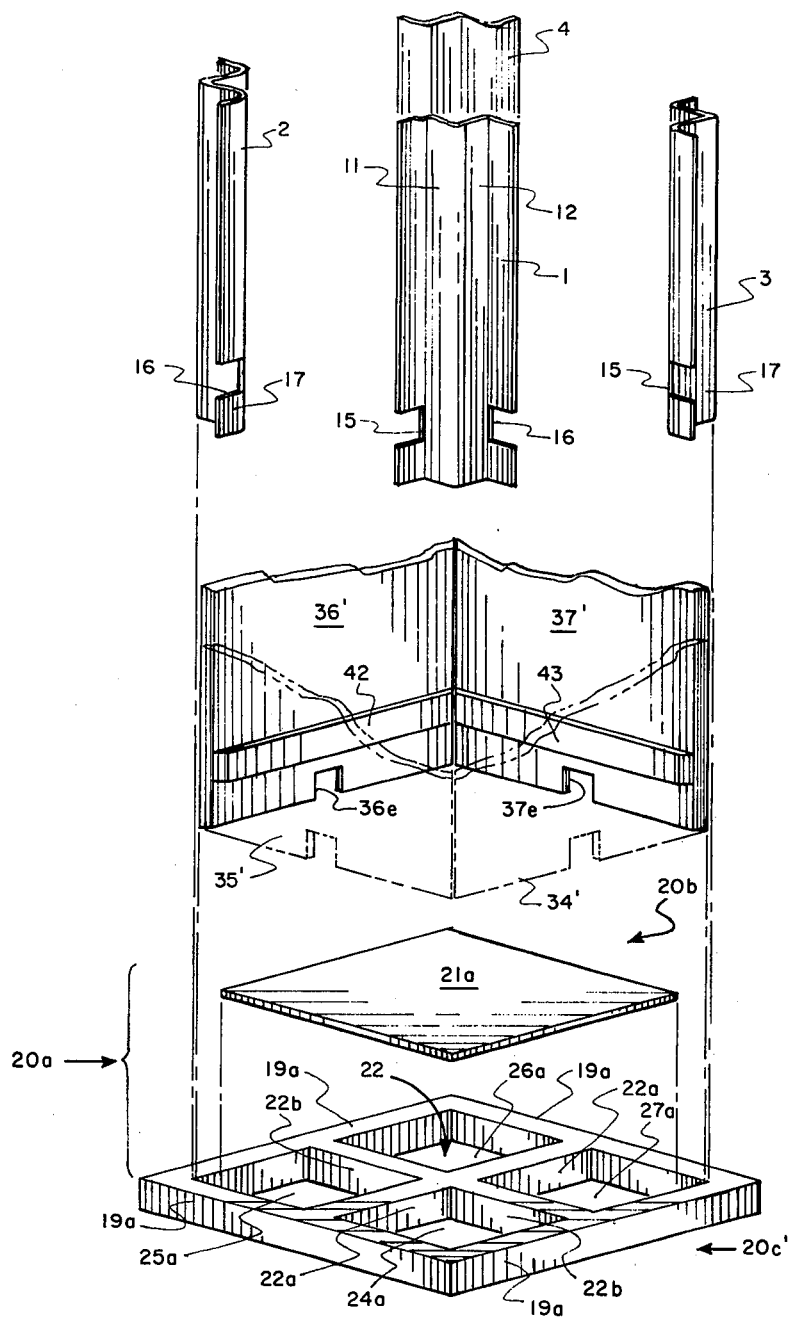

In a further embodiment, as shown in FIGS. 5 and 6, floor member 20 is replaced by exemplary alternative floor member 20a, which includes respectively upper and lower floor members 20b' and 20c'. Lower floor member 20c' comprises an outer peripheral frame section 19a having an inner cross member section 22 attached thereto. More specifically, inner cross member section 22 includes cross pieces 22a and 22b, respectively, each of which are preferably connected to the midpoints of each of the respective inner sides of frame member 19a, thereby forming rectangular-shaped openings 24a –27a. Sidewall members 34 – 37 have also been modified to further include cleats 40 – 43 and apertures 34e – 37e, respectively, the modified sidewall members being designated as 34'– 37'. Furthermore, cleats 40 – 43 may also be included as part of previously described sidewall members 34 – 37 (see FIGS. 1 – 4). Preferably as previously described, the vertically-extending edges of sidewalls 34' – 37' are mitered to facilitate interlocking engagement of the respective sidewalls one against the other. The materials of construction previously described for use in fabricating interlocking floor member 20 can be employed in building floor member 20a.

To assemble this latter embodiment, peripheral section 19a of lower floor member 20c' is inserted in slots 15 and 16, bracing support members 1 – 4 thereby being positioned within openings 24a – 27a. Upper floor member 20b', which in this case is comprised of floor element 21a, is placed upon and centered on lower floor member 20c. Sidewalls 34a – 37a are then set in position so that apertures 34e – 37e are supported on cross members 22a and 22b, respectively, cleats 40 – 43 thereby resting on floor member 21a for purposes of maintaining the floor member in its proper position within the confines of the subject container system. By employing cleats 40 – 43, a liner used in conjunction with disassembleable container 10 is prevented from being caught in the slit formed between respective floor and sidewall members (see FIGS. 1 and 3). Furthermore, cleats 40 – 43 prevent material stored in container 10, without the aid of a liner, from escaping during transit. Lid 28 is then secured atop the open container and the filling process is implemented as previously described. After container 10 reaches its destination, the contents are emptied and the disassembly procedure is conducted by reversing the steps employed in assembling the system. The disassembled containers may be stored in the confines of an assembled container to expedite reshipping without the necessity of employing auxiliary reshipping means. If larger systems are shipped therewith, larger containers may be used for reshipping of the disassembled parts since even more disassembled containers can then be shipped in each assembled unit. Alternatively, a special disassembleable unit can be designed to receive disassembled containers for return shipping purposes. Although a plurality of disassembled container systems may be stored in an assembled unit, about 5 to 7 disassembled containers are preferably stored therein.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A disassemblable, reusable, container system which, when assembled, is storeable in a relatively small area compared to a conventional container system, for storing and shipping materials, which comprises a plurality of bracing support members, each of said bracing support members including, at its lower end, a support leg section for maintaining said container system above the level of the surface upon which it is supported; a floor member including upper and lower portions engaging and joining with said support members for supporting the material to be shipped located within the confines of said container system, and including means for engaging and joining with said bracing members; a plurality of sidewall members, having their vertical edges located within the confines of said bracing support members, said adjacent vertical edges of said sidewall members being in bearing relationship one against the other, said bracing support members interlockingly engaging said sidewalls and joining with said floor member to support said sidewall members, and an interlocking lid member, which serves as a cover for said container system by protecting said material and which interlockingly secures and maintains the container in proper vertical alignment, supported on said bracing support members and said sidewall members, respectively, each of said bracing support members including a pair of slots for receiving the lower portion of the floor member, and upon engagement thereof, interlockingly bracking and maintaining said container system in proper alignment, said upper support portion including a floor section surrounded by a peripheral groove which in turn is circumscribed by an outer floor section and having notches included in each of the corners of said upper floor portion for engagement with said bracing support members, and said lower support portion being comprised of a peripheral frame member fabricated to interlockingly engage the slots of said bracing members to further lock said support members in position.

2. The disassemblable, reusable, container system of claim 1 wherein said bracing support members have a W-shaped crosssectional configuration which includes a pair of inwardly extending interbracing support sections attached along their interior, longitudinal edges, one to the other, and a pair of outer-bracing support sections attached to, and extending outwardly from, the exterior of the longitudinal edges of each of said inner support sections, having slots in the outer bracing support sections, each of said bracing support members including a protruding end section which joins with said lid for providing interlocking engagement of said disassemblable container system; the upper floor member portion includes notches which are substantially W-shaped and built for mating engagement with the bracking support members; each of said sidewalls has a cleat attached thereto and which said sidewall in an assembled position, is supported on said floor member; and the lid and floor members, respectively, each contain a peripheral groove for engaging said sidewalls and maintaining said container in the form of a strong box-like unit.

3. The container system of claim 2 wherein each of the bracing support members includes a protruding end section having a substantially V-shaped cross-sectional configuration for joining with said lid and providing for interlocking engagement of the container system within said lid member by means of a recess contained therein.

4. A disassemblable, reusable, container system which, when assembled, is storeable in a relatively small area compared to a conventional container system, for storing and shipping materials, which comprises a plurality of bracing support members, each of said bracing support members including, at its lower end, a support leg section for maintaining said container system above level of the surface upon which it is supported; a floor member, including upper and lower portions, engaging and joining with said bracing support members for supporting the material to be shipped located within the confines of said container system, and further including means for engaging and joining with said bracing members, the upper portion of the floor member comprising a floor element, and the lower portion of the floor member including an outer peripheral frame section having an inner cross-member section including cross pieces each connected to the mid point of each of the inner sides of said outer peripheral frame thereby forming rectangular-shaped openings, a plurality of sidewall members, having their vertical edges located within the confines of said bracking support members, said adjacent vertical edges of said sidewall members being in bearing relationship one against the other and including an aperture in the lower edge of said sidewall member for engagement with said inner cross-members, said bracing support members interlockingly engaging said sidewalls and joining with said floor member to support said sidewall members, an interlocking lid member, which serves as a cover for said container system by protecting said material and which interlockingly secures and maintains the container in proper vertical alignment, supported on said bracing support members and said sidewall members, respectively.

5. The container system of claim 2, wherein each of said sidewalls includes cleats attached thereto and which, when said sidewalls are in position, are supported on said floor member.

6. The container system of claim 4, wherein a means for filling and emptying said container is provided therein and includes orifice in said lid, having a recess at ist upper end, a flat plate being fitted within said recess to seal off said orifice.

* * * * *